United States Patent
Vissers et al.

(10) Patent No.: US 10,673,064 B2
(45) Date of Patent: Jun. 2, 2020

(54) MOLTEN FLUID ELECTRODE APPARATUS WITH SOLID LITHIUM IODIDE ELECTROLYTE HAVING IMPROVED LITHIUM ION TRANSPORT CHARACTERISTICS

(71) Applicant: Vissers Battery Corporation, Wheaton, IL (US)

(72) Inventors: Daniel R. Vissers, Wheaton, IL (US); Paul V. Braun, Champaign, IL (US)

(73) Assignee: Vissers Battery Corporation, Wheaton, IL (US)

( * ) Notice: Subject to any disclaimer, the term of this patent is extended or adjusted under 35 U.S.C. 154(b) by 159 days.

(21) Appl. No.: 15/982,480

(22) Filed: May 17, 2018

(65) Prior Publication Data

US 2019/0355968 A1 Nov. 21, 2019

(51) Int. Cl.
*H01M 4/131* (2010.01)
*H01M 10/0562* (2010.01)
(Continued)

(52) U.S. Cl.
CPC .......... *H01M 4/131* (2013.01); *H01M 4/134* (2013.01); *H01M 4/136* (2013.01); *H01M 10/04* (2013.01);
(Continued)

(58) Field of Classification Search
CPC ...... H01M 4/131; H01M 10/39; H01M 10/04; H01M 10/615; H01M 4/134; H01M 4/136;
(Continued)

(56) References Cited

U.S. PATENT DOCUMENTS 3,531,324 A 9/1970 Fischer et al.
4,007,315 A 2/1977 Brinkmann
(Continued)

FOREIGN PATENT DOCUMENTS

EP 1723080 B1 6/2014
FR 2934087 7/2008
(Continued)

OTHER PUBLICATIONS

Thomas, Shane, International Preliminary Report on Patentability and Written Opinion, PCT/US2019/027339, The International Bureau of WIPO, dated Jul. 5, 2019.
(Continued)

*Primary Examiner* — Gary D Harris
(74) *Attorney, Agent, or Firm* — Gavrilovich, Dodd & Lindsey LLP; Charles D. Gavrilovich, Jr.

(57) ABSTRACT

Performance of a thermal lithium battery is improved by improving the ion-transport characteristics of a solid lithium iodide electrolyte. The lithium iodide lattice of the solid electrolyte includes defects that improve the ion-transport characteristics of the solid lithium iodide electrolyte. In one example, the defects are due to the introduction of nanoparticles that result in grain boundary defects. The defects resulting at the grain boundaries with the nanoparticles improve the ion transport characteristics of the electrolyte. In another example, defects originating from the synthesis process are pinned by the presence of nanoparticles and/or the reinforcing structure. In another example, the defects are aliovalent substitution defects. A cation that is aliovalent to the lithium cation ($Li^+$), such as a barium cation ($Ba^{2+}$), creates an aliovalent substitution defect in the lithium iodide lattice. In order to maintain charge neutrality in the lattice, two lithium cations are replaced by a single barium cation creating the defect in the lattice.

27 Claims, 10 Drawing Sheets

(51) Int. Cl.

| | |
|---|---|
| *H01M 4/136* | (2010.01) |
| *H01M 4/134* | (2010.01) |
| *H01M 10/615* | (2014.01) |
| *H01M 10/04* | (2006.01) |
| *H01M 10/39* | (2006.01) |
| *B82Y 30/00* | (2011.01) |
| *H01M 4/02* | (2006.01) |

(52) U.S. Cl.
CPC ....... *H01M 10/0562* (2013.01); *H01M 10/39* (2013.01); *H01M 10/615* (2015.04); *B82Y 30/00* (2013.01); *H01M 2004/021* (2013.01); *H01M 2004/027* (2013.01); *H01M 2004/028* (2013.01)

(58) Field of Classification Search
CPC ....... H01M 10/0562; H01M 2004/028; H01M 2004/027; H01M 2004/021; H01M 2300/0094; H01M 2300/0091; H01M 2300/0074; H01M 2/1646; B82Y 30/00
USPC .......................................... 429/104
See application file for complete search history.

(56) References Cited

U.S. PATENT DOCUMENTS

| | | | |
|---|---|---|---|
| 4,584,251 | A | 4/1986 | Hunziker |
| 4,913,985 | A | 4/1990 | Baer |
| 5,070,933 | A | 12/1991 | Baer |
| 5,385,793 | A | 1/1995 | Tiedemann |
| 5,534,367 | A | 7/1996 | Kaun |
| 5,569,552 | A | 10/1996 | Rao |
| 5,834,132 | A | 11/1998 | Hasegawa |
| 6,329,096 | B2 | 12/2001 | Kawakami |
| 6,551,740 | B1 | 4/2003 | Melichar |
| 6,683,002 | B1 | 1/2004 | Chooi et al. |
| 8,404,375 | B2 | 3/2013 | Gaben |
| 2009/0311603 | A1 | 12/2009 | Visco |
| 2010/0104936 | A1 | 4/2010 | Meintschel |
| 2010/0243017 | A1 | 9/2010 | Normann et al. |
| 2010/0330439 | A1 | 12/2010 | Halbert |
| 2012/0003516 | A1 | 1/2012 | Eisenhour |
| 2012/0171524 | A1 | 7/2012 | Hiraiwa et al. |
| 2013/0122331 | A1 | 5/2013 | McDonald |
| 2015/0226806 | A1 | 8/2015 | Kim et al. |
| 2016/0156062 | A1 | 6/2016 | Littau et al. |
| 2016/0365612 | A1 | 12/2016 | Bradwell et al. |
| 2017/0365853 | A1 | 12/2017 | Visco et al. |

FOREIGN PATENT DOCUMENTS

| | | | | |
|---|---|---|---|---|
| JP | 2014229591 | | 12/2014 | |
| JP | 2014229591 | A * | 12/2014 | ........ H01M 10/3945 |
| WO | 20170143088 | | 8/2017 | |
| WO | 2017147713 | | 9/2017 | |
| WO | 2017152171 | | 9/2017 | |

OTHER PUBLICATIONS

Thomas, Shane, International Preliminary Report on Patentability and Written Opinion, PCT/US2019/027344, The International Bureau of WIPO, dated Jul. 10, 2019.
Thomas, Shane, International Preliminary Report on Patentability and Written Opinion, PCT/US2019/027351, The International Bureau of WIPO, dated Jul. 30, 2019.
Thomas, Shane, International Preliminary Report on Patentability and Written Opinion, PCT/US2019/027354, The International Bureau of WIPO, dated Jun. 27, 2019.
Thomas, Shane, International Preliminary Report on Patentability and Written Opinion, PCT/US2019/027356, The International Bureau of WIPO, dated Jul. 10, 2019.
Thomas, Shane, International Preliminary Report on Patentability and Written Opinion, PCT/US2019/027359, The International Bureau of WIPO, dated Jul. 10, 2019.
Electrochemical Power Sources; Primary & Secondary Batteries; Edited by: M Barak Published by: The Institution of Electrical Engineers, London and New York; Peter Peregrinus Ltd., Stevenage, UK, and New York, ISBN 0-906048-26-5, pp. 318-321.
Molleigh Preefer; MTRL 286G, Spring 2016 "Lithium-Sulfur batteries and discharge products from cycling"; pp. 1-20.
Farday Constant; Wikipedia, https://en.m.wikipedia.org/wiki/Faraday_constant; pp. 1-3.
Kurt J. Lesker Company website; Feedthroughs & Viewports; https://www.lesker.com/newweb/menu_Feedthroughs.cfm?section=liquid&init=skip.
Incell Ceo, Stefan Jansson interview; Smart lithium batteries for Telecom industry; https://www.youtube.com/watch?v=FZsiQyqF1r1&feature=youtu.be.
Willmott, A.J. ; http://www.thermopedia.com/content/1832/Regenerative Heat Exchangers; pp. 1-18.
Recuperator; Wikipedia, https://en.wikipedia.org/Rucuperator, pp. 1-4 https://en.wikipedia.org/wiki/.
https://en.wikipedia.org/Regeneratiave_heat_exchanger, pp. 1-4.
Honeywell, "Dielectric Constant Table", www.honeywellprocess.com/library/marketing/tech-specs/Dielectric%20Constant%20Table.pdf, Jun. 6, 2011, p. 45.
https://www.sensormag.com/components/a-dozen-ways-to-measure-fluid-level-and-how-they-work [finish] Hopper, Henry; A Dozen Ways to Measure Fluid-level and How they Work; Sensors Online; Components; pp. 1-11.
https://en.m.wikipedia.org/wiki/Flow_battery; pp. 1-14.
DOW Data Sheet https://msdssearch.dow.com/PublishedLiteratureDOWCOM-dh_0880/0901b80380880bfe.pdf?filepath=/heattrans/pdfs/noreg/176-01435.pdf&frompage=GetDoc (more . . . ) pp. 1-28.
Suberu, Mohammed Yekini, "Energy storage system for renewable energy power sector integration and mitigation of intermittency" Renewable and Sustainable Energy Reviews 35(2014) 499-514; journal homepage: www.elsevier.com/locate/rser.
https://www.hielscher.com/ultrasonically-Homogenizers for Liquid Processing; pp. 1-15.
https://www.hielscher.com/ultrasonically-assisted-catalytic-extraction.htm; pp. 1-8.
http://www.fiberceramics.com/Selee_Corporation_Metal_Foam_Details.php; SELEE Ceramic Foam Filters—World leader in foundry metal filtration and advanced ceramic; pp. 1-5.
https://en.m.wikipedia.org/wiki/Plastic_Extrusion; pp. 1-8.
Greebblatt, Martha; Ionic Conductors; ; Rutgers, The State University of New Jersey USA; pp. 1-34.
Material and Process Selection Charts; CES 2010 EDUPACK; Granta Material Insp; Cambridge University; pp. 1-41.
https://en.m.wiktionary.org/wiki/aliovalent; pp. 1-2.
https://en.m.wikipedia.org/wiki/Crystallographic_defect; pp. 1-7.
https://link.springer.com/article/10.1007/s11581-015-1498-8; Jolley, A., et al.; Improving the ionic conductivity of NASICON through aliovalent cation substitution of Na3Zr2Si2PO12; Ionics (2015) 21:3031-3038.
Liang, C.C., et al., "A High Energy Density Solid-State Battery System"; J. Electrochem. Soc., Electrochemical Science and Technology; Apr. 1976; pp. 453-458.
Liang, C.C.; "Conduction Characteristics of the Lithium Iodide-Aluminum Oxide Solid Electrolytes"; J. Electrochem. Soc., Oct. 1973; pp. 1289-1292.
Rea, J.R. et al., "Development of a Solid-State Secondary Battery System"; Solid State Ionics 314 (1981); 267-271.
Okamoto, H.; the Li-S (Lithium-sulfur) System; Asahi University; Journal of Phase Equilibria, vol. 16, No. 1, Feb. 1995, pp. 94-97.
Liang, C.C., et al., "Solid-State Storage Battery System"; J. Applied Electrochemistry; 8 (1978) 445-454.
https://en.m.wikipedia.org/wiki/Molten-salt_battery; pp. 1-5.
https://en.m.wikipedia.org/wiki/Ford Ecostar; pp. 1-4.
https://en.m.wikipedia.org/wiki/State_diagram; pp. 1-9.

(56) References Cited

OTHER PUBLICATIONS

Zhang, Shuo, et al.; "Advanced electrolyte/additive for lithium-ion batteries with silicon anode"; Science Direct; Current Opinion in Chemical Engineering; vol. 13, Aug. 2016; pp. 24-35.

Zhan Lin, et al., "Lithium-Sulfer Batteries: From Liquid to Solid Cells?" Department of Chemical & Biological Engineering, Zhejiang University, Hangzhou, Zhejiang, China; Center for Nanophase Materials Sciences, Oak Ridge National Laboratory, Oak Ridge, TN, USA.

https://authors.library.caltech.edu/5456/1/hrst.mit.edu/hrs/materials/public/Weber&Kummer1967.htm; Weber, Neil et al., Sodium-Sulfur Secondary Battery; Session on Vehicle Propulsion Batteries—Ford Motor Company.

Jolley et al., "Improving Ionic Conductity of NASICON through aliovalent cation substitution of Na3Xr2Si2PO12"; Ionics (2015) 21:3031-3038.

https://en.m.wikipedia.org/wiki/Ionic radius; pp. 1-12.

\* cited by examiner

US 10,673,064 B2

MOLTEN FLUID ELECTRODE APPARATUS WITH SOLID LITHIUM IODIDE ELECTROLYTE HAVING IMPROVED LITHIUM ION TRANSPORT CHARACTERISTICS

FIELD

This invention generally relates to thermal batteries and more particularly to methods, devices, and systems with fluid electrodes and a lithium iodide (LiI) solid electrolyte with improved lithium ion transport characteristics due to defects in the lithium iodide lattice.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high temperature batteries and include, for example, devices sometimes referred to as liquid-metal batteries and rechargeable liquid-metal batteries. Thermal lithium batteries generally have a relatively high gravimetric energy density (kWh/kg).

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Performance of a thermal lithium battery is improved by improving the ion-transport characteristics of the solid lithium iodide electrolyte. The lithium iodide lattice of the solid electrolyte includes atomic scale defects that improve the ion-transport characteristics of the solid lithium iodide electrolyte. In one example, the defects are due to the introduction of nanoparticles that result in grain boundary defects and/or sustain existing grain boundary defects. The change in bonding, vacancies, and other defects resulting at the grain boundaries with the nanoparticles improve the ion transport characteristics of the electrolyte. As discussed below, the introduction of nanoparticles can minimize the dissipation of previously formed defects in an effect sometimes referred to as "pinning". Such previously formed defects may be formed during the synthesis process and also improve the ion transport characteristics. In another example, the defects originate from aliovalent substitution in the lattice. An aliovalent cation substitution with the lithium cation ($Li^+$) creates an aliovalent substitution defect in the lithium iodide lattice. For instance, introducing a barium cation ($Ba^{2+}$) that is aliovalent to the lithium cation ($Li^+$) creates an aliovalent substitution defect in the lithium iodide lattice. In order to maintain charge neutrality in the lattice, two lithium cations are replaced by a single barium cation creating the defect in the lattice possibly a vacancy in one of the original lithium cation positions. Therefore, one or more materials may be introduced to the LiI lattice to form grain boundary defects, maintain existing defects and/or to create aliovalent substitution defects to improve the ion transport characteristics of the lattice.

Figure 1:
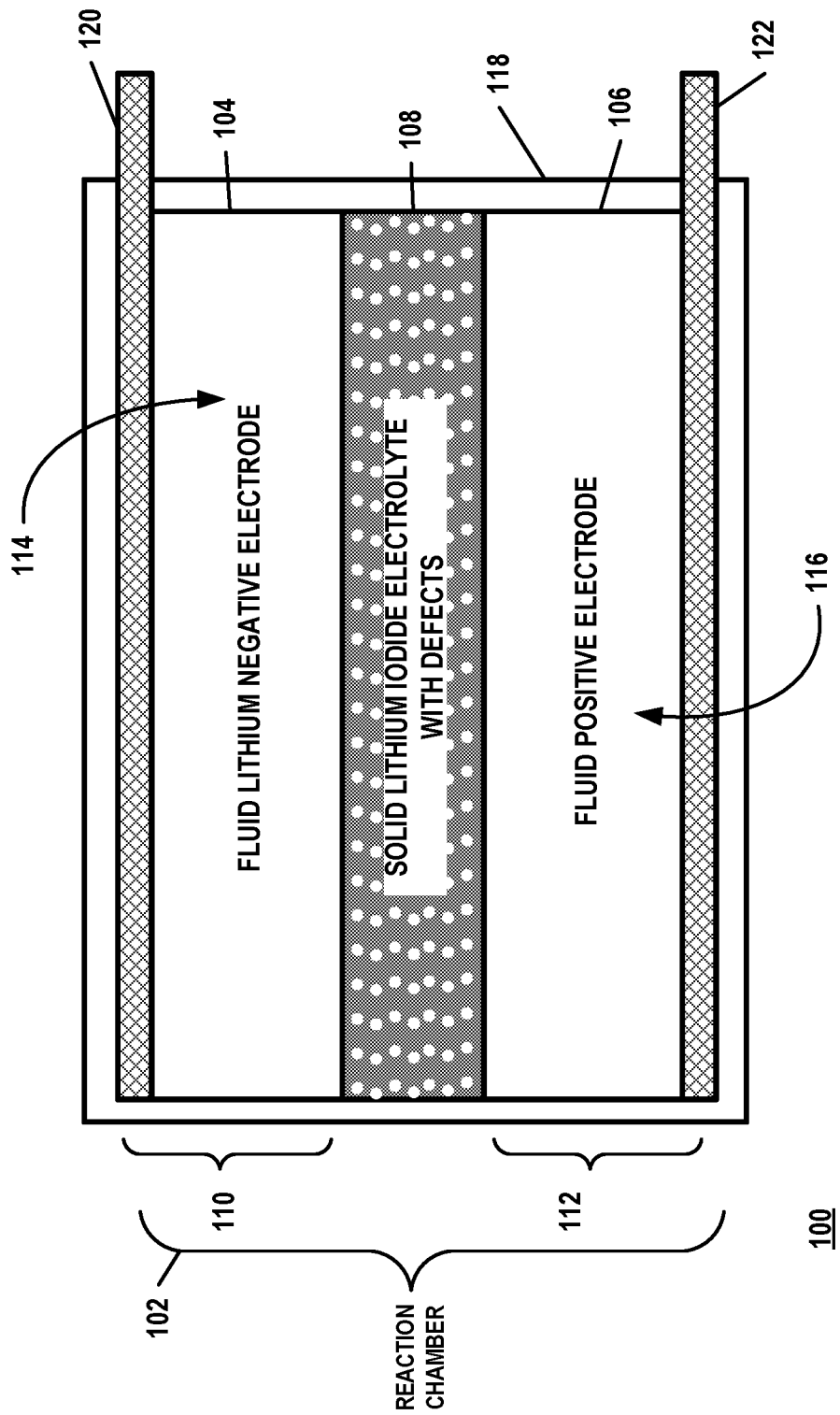
FIG. 1 is a block diagram of an example of a battery including a reaction chamber having fluid electrodes separated by a solid lithium iodide electrolyte with defects.

FIG. 1 is a block diagram of an example of a battery apparatus 100 including a reaction chamber 102 having fluid electrodes 104, 106 separated by a solid lithium iodide electrolyte 108 having a plurality of defects within the solid electrolyte lattice. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. As referred to herein, a solid electrolyte is any material, mixture, compound, or other combination of materials that forms an electrolyte structure that is in the solid phase. This differs from gel electrolytes that include material in the liquid phase and solid phase. Although the LiI is in the solid phase within the operating temperature range, the electrolyte material may be soft as the temperature approaches the melting point of LiI. The solid electrolyte 108 for the examples herein has a lithium iodide lattice structure with defects. The solid lithium iodide electrolyte 108, therefore, includes a lattice formed of lithium cations and iodide anions where defects are distributed within the lattice.

The battery apparatus 100 includes at least a reaction chamber 102 having a negative electrode region 110 and a positive electrode region 112 separated from the negative electrode region 110 by the solid lithium iodide electrolyte 108. The negative electrode region 110 contains a negative electrode material 114 and the positive electrode region 112 contains a positive electrode material 116. For the examples herein, the negative electrode material 114 comprises lithium (Li) and the positive electrode material 116 comprises sulfur (S). In some situations, the positive electrode material 116 also comprises phosphorous (P). The battery apparatus 100 also includes a heating system 118 for sufficiently heating the positive and negative electrode materials in the reaction chamber 102 during operation. The electrode materials 114, 116 are maintained in a fluid state when the battery apparatus 100 is operating by heating the electrode materials 114, 116 while maintaining the solid lithium iodide electrolyte 108 is in a solid state. Accordingly, the operating temperature of the reaction chamber is below the melting point of the solid lithium iodide electrolyte 108. For the example of FIG. 1, the heating system 118 is an electrical heating system including one or more heating elements that facilitate the heating of the reaction chamber 102 to place the electrode materials 114, 116 in a fluid state. Other types of heating systems 118 can be used in some circumstances. The heating system heats the reaction chamber such that the negative electrode material 114 and the positive electrode material 116 are in a fluid state while the solid lithium iodide electrolyte 108 is maintained in a solid state.

The fluid negative electrode material 114 in the negative electrode region 110 forms a fluid negative electrode 104 of the battery apparatus 100. The fluid positive electrode material 116 in the positive electrode region 112 forms a fluid positive electrode 106 of the battery apparatus 100. The fluid electrodes 104, 106 and the electrode materials may include more than a single element. For example, the positive electrode region 112 may also contain some reactions products resulting from the operation of the battery apparatus 100. A first current collector 120 is positioned within the fluid negative electrode 104 and second current collector 122 is positioned within the positive fluid electrode 106. With the properly placed current collectors 120, 122 within each electrode 104, 106, electrical energy can be harnessed from the electrochemical reaction occurring within the battery between the fluid negative electrode 104 and the fluid positive electrode 106 through the solid lithium iodide electrolyte 108. Therefore, the operation of the reaction chamber 102 in the example of FIG. 1 is similar to the operation of conventional thermal batteries. A significant advantage over conventional thermal batteries, however, includes the solid electrolyte with defects that improve ion transport characteristics compared to conventional solid electrolytes used in thermal batteries. Although solid lithium iodide electrolytes have been suggested, none of the conventional techniques contemplate using a solid lithium iodide electrolyte to separate fluid electrodes. The only known techniques for introducing defects in lithium iodide are not compatible with a fluid lithium electrode. In accordance with the techniques discussed herein, the performance of a lithium thermal battery is improved over conventional batteries by improving the ion-transport characteristics of the solid lithium iodide electrolyte. The lithium iodide lattice of the solid electrolyte includes defects that improve the ion-transport characteristics of the solid lithium iodide electrolyte. In one example, the defects are due to the introduction of nanoparticles that result in grain boundary defects and/or pin existing grain boundary defects. In another example, the defects are a result of aliovalent substitution in the lattice.

The operating temperature, or temperature ranges, of the negative electrode region and positive electrode region may be selected based on several factors including, for example, the melting point of the negative electrode material, the melting point of the positive electrode material, the boiling point of the negative electrode material, the boiling point of the positive electrode material, the eutectic point of the positive electrode material and resulting chemical species, and the melting point of the solid electrolyte. In some situations, the melting point of at least portions of the solid electrolyte may depend on the materials and concentrations selected to produce the aliovalent substitution. For the examples discussed herein, the heating system 118 maintains the negative electrode region 110 and the positive electrode region 112 of the reaction chamber 102 at the same temperature in order to avoid a temperature gradient across the solid electrolyte 108. In some situations, the two regions of the reaction chamber may be maintained at different temperatures.

The heating system 118 maintains the reaction chamber 102 at the appropriate temperature to facilitate the desired reaction between the sulfur and lithium through the solid lithium iodide electrolyte 108. For the example of FIG. 1, the temperature of the negative electrode region 110 and the positive electrode region 112 is maintained at a temperature around 400 degrees Celsius (° C.). The operating temperature may be based on several factors including the characteristics of the materials of the electrodes and solid electrolyte. For the example of FIG. 1, some of the characteristics that can be considered include the melting point of lithium iodide, 469° C., the boiling point of sulfur, 444.6° C., and the eutectic melting point of lithium polysulfide products ($Li_nS_m$), 365° C. In some situations, the introduction of aliovalent substitutions in the lattice lowers the melting point of pure lithium iodide. A temperature range that is above the eutectic melting point of lithium polysulfide products but below the melting point of LiI provides the temperature range of 365° C. to 469° C. that can be used in some circumstances. Maintaining the temperature below the boiling point of sulfur may be useful and provides a range of 365° C. to 444° C. that can be used in other circumstances. A suitable temperature range, however, includes temperatures between 375° C. and 425° C. The wider temperature range of 115.21° C. to 469° C. can also be used in still other situations. For the examples herein, the temperatures of the negative electrode region 110 and the positive electrode region 112 are maintained at approximately the same temperature. Among other advantages, such a scheme avoids a temperature gradient across the solid LiI electrolyte 108. In some situations, however, the temperatures may be different between the electrode regions. Other temperature ranges and schemes can be used as long as the electrode materials are fluid and the electrolyte is solid. As a result, the temperature of the positive electrode region 112 should be above the melting point of sulfur, 115.21° C., and the negative electrode region 110 should be above the melting point of lithium, 180.5° C. In many situations, the operating temperature range of the battery is at least partially based on the characteristics of the defects. For example, the materials and concentrations used for aliovalent substitution defects may impact the melting point of at least portions of the solid electrolyte. Also, nanoparticles may also impact the melting point of the solid electrolyte although likely to a lesser degree than aliovalent substitution techniques.

During operation of the battery apparatus 100, the electrochemical reaction may result in other compounds or products being formed. For example, in addition to the positive electrode region containing sulfur, the region may also contain di-lithium polysulfide species ($Li_2S_n$ where n is two or higher) and di-lithium sulfide ($Li_2S$). Typically, the reaction through the electrolyte will result in several different chemical species, such as $Li_2S_m$ where m is an integer equal to one or more. Any number of chemical species may result and may include, for example $Li_2S$, $Li_2S_2$, $Li_2S_4$, and $Li_2S_6$ products as well as others in some circumstances.

In some situations, additional materials may be added to the positive electrode material and/or to the negative electrode material. For example, phosphorus can be included in the positive electrode material resulting in a fluid phosphorus-sulfur positive electrode. Therefore, another example of the fluid electrode battery 100 includes a lithium phosphorus-sulfur (LiPS) battery. In one example, therefore, the positive electrode material comprises sulfur and, in another example, the positive electrode material comprises sulfur and phosphorous. Examples of suitable temperature ranges for the reservoirs and reaction chamber for a LiPS battery include the ranges discussed above.

Although at least some of the examples discussed herein include two molten fluid electrodes at the operating temperature of the battery, one of the electrodes may be solid in some situations. For example, the negative electrode material may include lithium and silicon or lithium and aluminum where the melting point may be higher than the operating temperature of the battery. Accordingly, the solid lithium iodide electrolyte may be positioned between a fluid positive electrode including sulfur and a solid negative electrode comprising lithium and silicon, lithium and aluminum, or some other material comprising lithium and having a melting point above the operating temperature of the battery.

Figure 2:
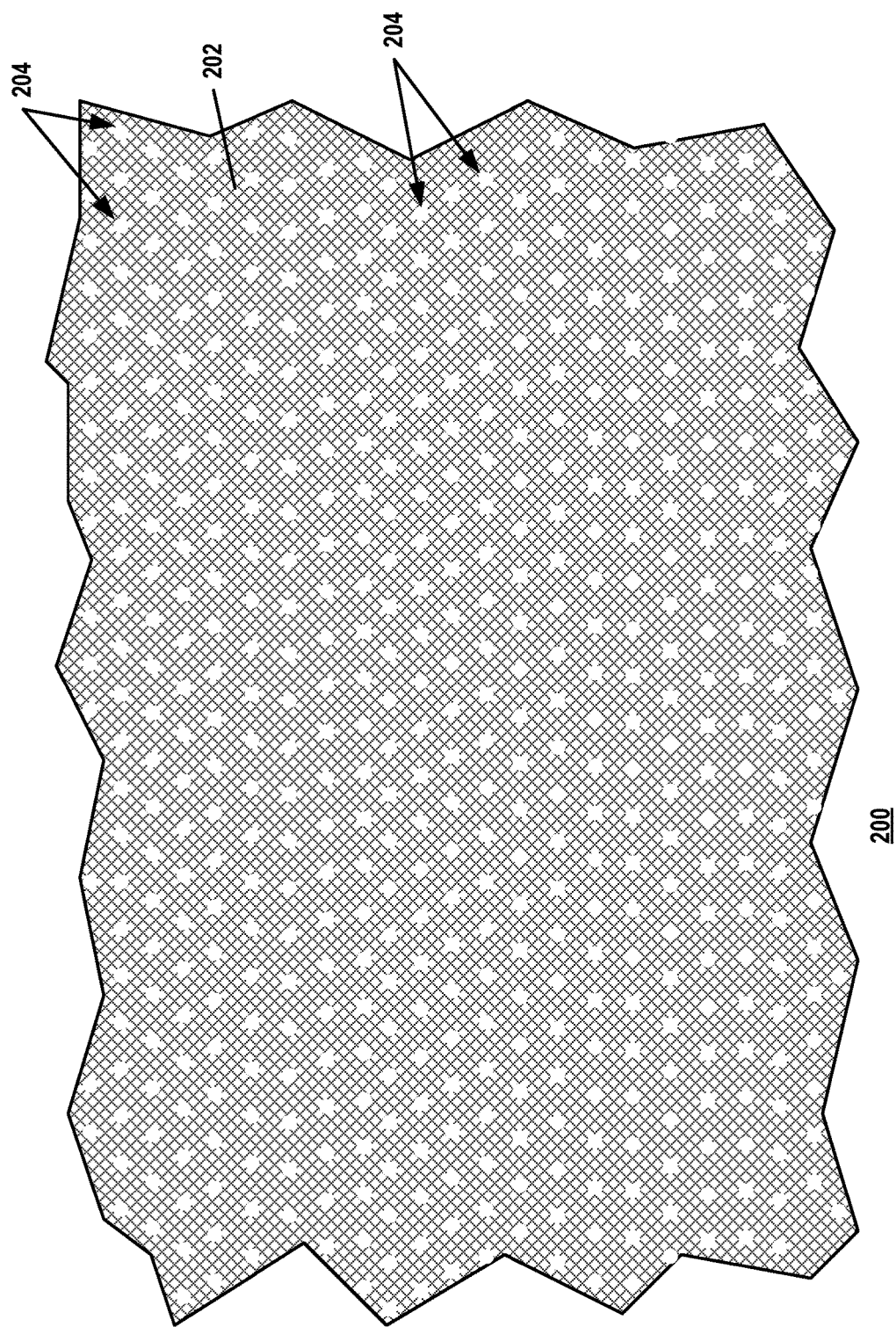
FIG. 2 is an illustration of an example of a portion of the solid lithium iodide electrolyte material with defects.

FIG. 2 is an illustration of an example of a portion 200 of the solid lithium iodide electrolyte 108 material. FIG. 2 is a visual representation of the portion of material and is not necessarily intended to represent distances or sizes to scale or accurately depict the shapes of the components that are discussed. The solid electrolyte includes a lithium iodide lattice 202 formed by lithium cations and iodide anions. The lattice 202 is represented by crosshatching in FIG. 2. A plurality of defects 204 are distributed within the lattice 202. As is known, crystalline solids exhibit a periodic crystal structure. The positions of atoms or molecules occur on repeating fixed distances, determined by the unit cell parameters. By introducing impurities, the arrangement of atoms or molecules in the lattice is no longer perfect. The regular patterns are interrupted by defects. In accordance with the techniques discussed herein, the pattern of the lithium iodide lattice structure is disrupted by introducing other materials. In one example, as discussed with reference to FIG. 3 and FIG. 4, the defects relate to the introduction of nanoparticles. In some situations, the introduction of nanoparticles results in grain boundary defects. Additionally or alternatively, existing grain boundary defects in the lattice may be stabilized with nanoparticles. Such a result, sometimes referred to as "pinning," occurs where existing grain boundary defects, that otherwise might have dissipated over time, are more easily sustained due to the introduction of the nanoparticles. The bond changes, vacancies and other defects resulting or sustained at the grain boundaries with the introduction of the nanoparticles improve the ion transport characteristics of the electrolyte. In another example, discussed with reference to FIG. 5, the defects are aliovalent substitution defects. A cation that is aliovalent to the lithium cation ($Li^+$), such as a barium cation ($Ba^{2+}$), creates an aliovalent substitution defect in the lithium iodide lattice. In order to maintain charge neutrality in the lattice, two lithium cations are replaced by a single barium cation creating the defect in the lattice potentially at a vacancy at one of the original lithium cation locations.

Figure 3:
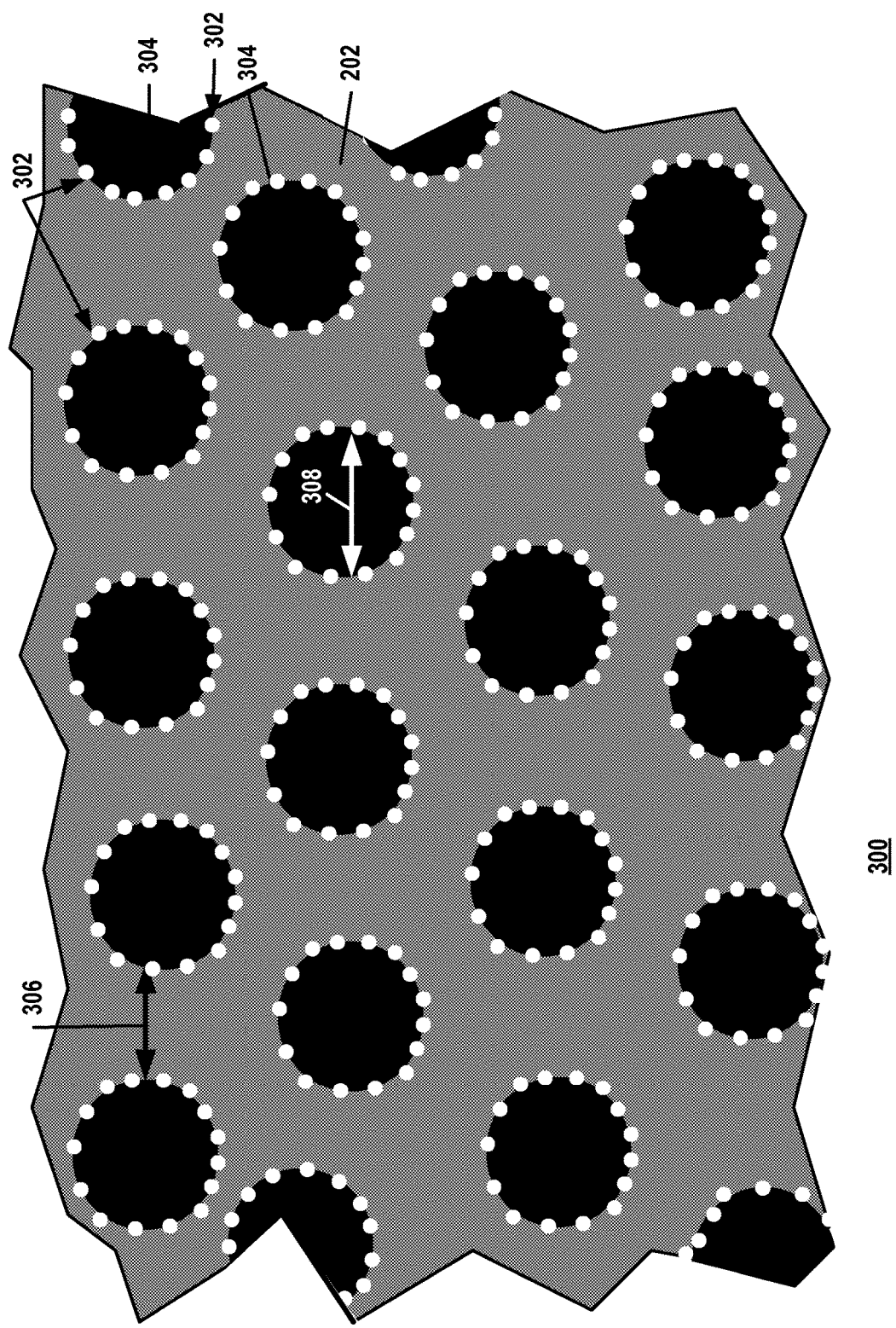
FIG. 3 is an illustration of a portion of the solid lithium iodide electrolyte for an example where the plurality of defects is a plurality of grain boundary defects.

FIG. 3 is an illustration of a portion 300 of the solid lithium iodide electrolyte 108 for an example where the plurality of defects 302 is a plurality of grain boundary defects that may be due to dangling bonds, changes in bonding, vacancies, and other defects occurring at the grain boundary. FIG. 3 is a visual representation of the portion of material and is not necessarily intended to represent distances or sizes to scale or accurately depict the shapes of the components that are discussed. A dangling bond is an unsatisfied valence on an immobilized atom. An atom with a dangling bond is also referred to as an immobilized free radical or an immobilized radical, a reference to its structural and chemical similarity to a free radical. On a surface of a material, dangling bonds occur because the atoms of the normal lattice no longer continue in space. By introducing a nanoparticle into the lithium iodide lattice, dangling bonds and other defects can be formed at the boundary between the nanoparticle and the lattice material. In FIG. 3, the incorporated nanoparticles 304 are represented by larger black circles while the smaller white circles at the interface between the nanoparticle and the lithium iodide lattice represent the grain boundary defects 302 formed by the introduction of the nanoparticles into the lithium iodide lattice. In order to maximize the improvement in ion transport characteristics, the distance 306 between nanoparticles is minimized. As the distance 306 is reduced, however, the structural integrity of the lattice 202 is also reduced. As a result, for the example, the distance 306 between nanoparticles 304 is not minimized beyond the point where the structural integrity of the lattice is significantly compromised and the material is not suitable for use as a solid electrolyte in a thermal battery. For the example of FIG. 4, magnesium oxide nanoparticles are incorporated into the lithium iodide lattice 202. For the examples discussed herein, the nanoparticles are on the order of 20 nm in size 308 or approximately 200 bond lengths. Other nanoparticle sizes and materials may be used in some situations. Examples of other nanoparticle materials include Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium(III) oxide ($Er_2O_3$), Yttrium(III) oxide ($Y_2O_3$), Lithium chloride (LiCl), Holmium(III) oxide ($Ho_2O_3$), Neodymium(III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), and Mendelevium(III) oxide ($Md_2O_3$). Other potential nanoparticle materials that may be suitable for use with lithium iodide include Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3MgSi_2O_7$, Merwinite ($Ca_3Mg(SiO_4)_2$), Calcium silicate ($CaSiO_3$). In some situations, more than one type of nanoparticle material can be used. Also, some materials may more easily dissolve in LiI and selection of the nanoparticles may be at least partially based on how easily the material dissolves in LiI.

Figure 4:
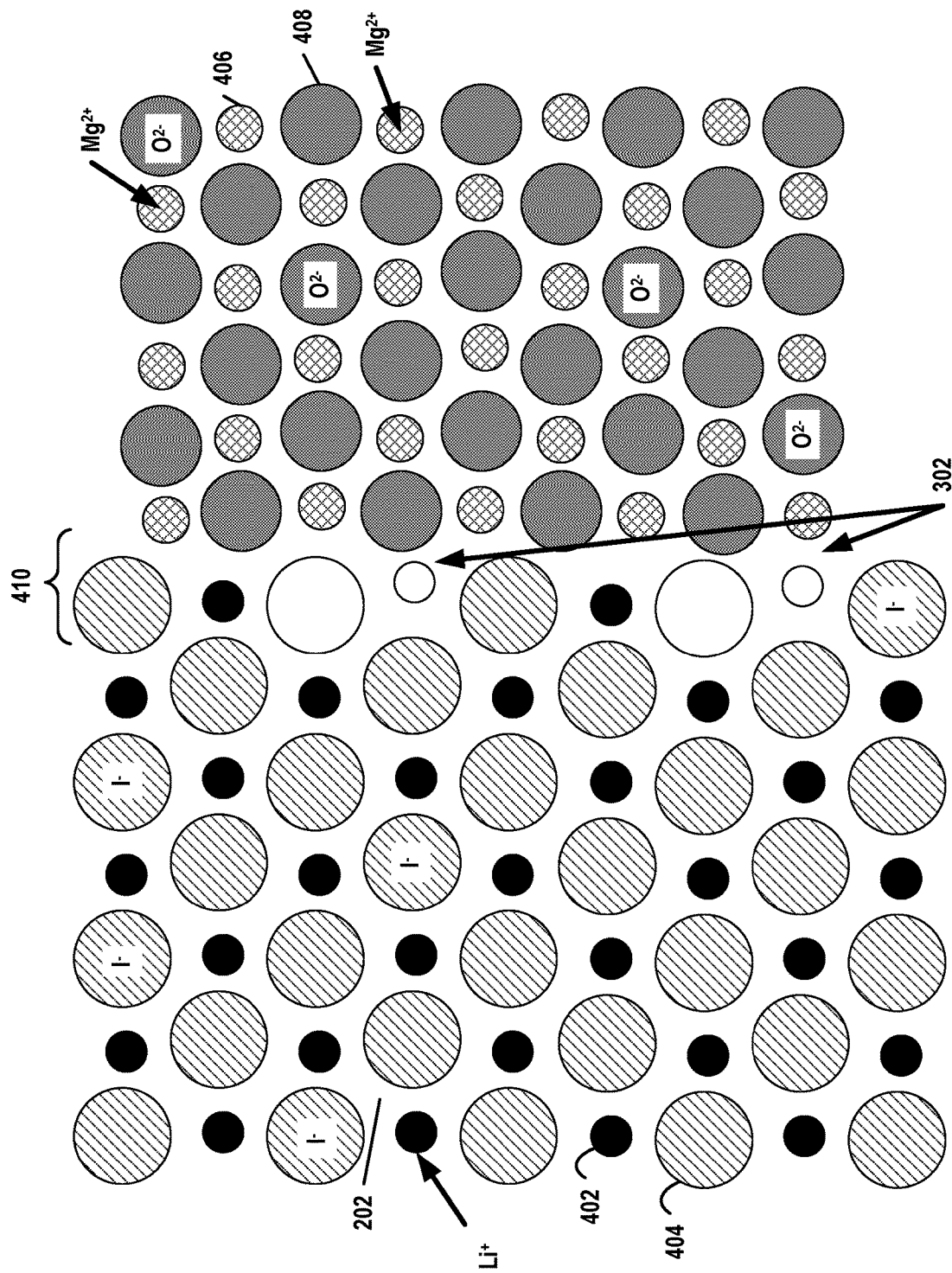
FIG. 4 is an illustration of a portion of the solid lithium iodide electrolyte for an example where the nanoparticle material is magnesium oxide (MgO).

FIG. 4 is an illustration of a portion 400 of the solid lithium iodide electrolyte for an example where the nanoparticle material is magnesium oxide (MgO). FIG. 4 is a visual representation of the portion of material and is not necessarily intended to represent distances or sizes to scale or accurately depict the shapes of the components that are discussed. In the interest of clarity, the illustration is a two-dimensional model and does not show the ions extending from the plane of the drawing. Further, the illustration is a portion of the solid electrolyte emphasizing the interface between the nanoparticle and the lithium iodide lattice and, as result, only includes representations of a few ions. In FIG. 4, the lithium cations ($Li^+$) 402 are represented with black circles, the iodide anions ($I^-$) 404 are presented with single crosshatched circles, the magnesium cations ($Mg^{2+}$) 406 are represented with double crosshatched circles and the oxide anions ($O^{2-}$) 408 are presented with shaded circles. A plurality of defects 302 form at the grain boundary 410. The defects 302 are represented by clear circles in FIG. 4 to indicate a disruption of the lithium iodide lattice.

Figure 5:
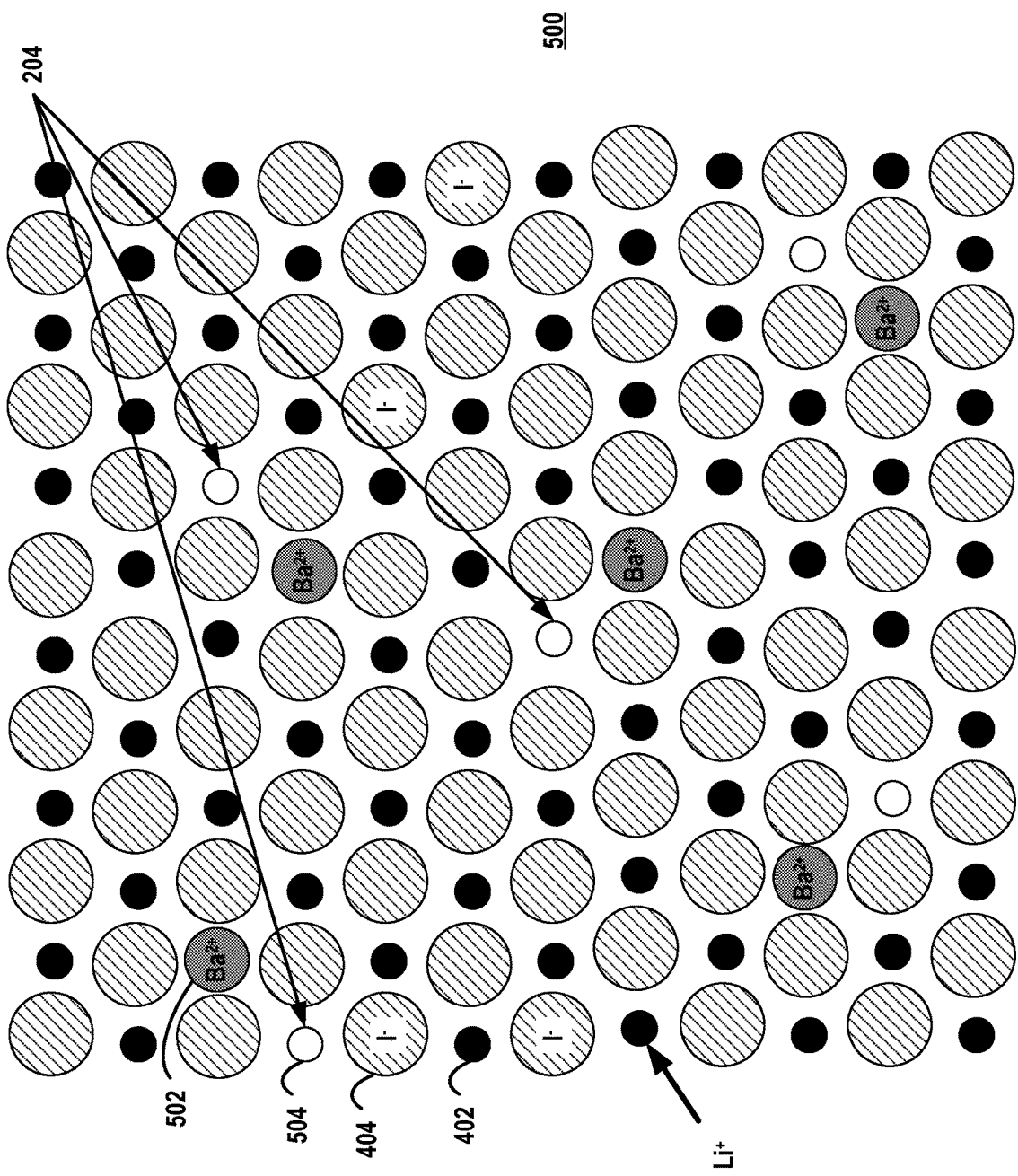
FIG. 5 is an illustration of an example of a portion of the solid lithium iodide electrolyte including aliovalent substitution defects.

FIG. 5 is an illustration of an example of a portion 500 of the solid lithium iodide electrolyte 108 including aliovalent substitution 502 that induces an aliovalent substitution defect 504. FIG. 5 is a visual representation of the portion of material and is not necessarily intended to represent distances or sizes to scale or accurately depict the shapes of the components that are discussed. In the interest of clarity, the illustration is a two-dimensional model and does not show the ions extending from the plane of the drawing. Further, the illustration is a portion of the solid electrolyte emphasizing the interface between the introduced defect-causing ions and the lithium iodide lattice and, as a result, only includes representations of a few ions. In FIG. 5, the lithium cations ($Li^+$) 402 are represented with black circles, the iodide anions ($I^-$) 404 are presented with single crosshatched circles, and the defect causing ions 502 are represented with shaded circles. The defects 504 are represented by clear circles in FIG. 5 to indicate a disruption of or defect in the lithium iodide lattice. For the example of FIG. 5, the defect causing ions are barium cations ($Ba^{2+}$). The barium cations induce defects in the lattice structure for the lithium iodide. Generally, a defect causing ion is incorporated at a regular atomic site in the lattice structure. This regular atomic site is not a vacant site and the ion is not on an interstitial site. These disruptions in the normal crystal structure are typically referred to as substitutional defects. Substitutional defects may be isovalent substitution defects or aliovalent substitution defects. Isovalent substitution occurs where the ion that is substituting the original ion is of the same oxidation state as the ion it is replacing. Aliovalent substitution occurs where the ion that is substituting the original ion is of a different oxidation state than the ion that it is replacing. For the example herein, the barium cation results in an aliovalent substitution since it has a +2 charge and lithium has a +1 charge. Aliovalent substitutions change the charge at specific lattice locations within the material, but the overall material must remain charge neutral. Therefore, a charge compensation mechanism is required. As a result, either one of the metals is partially or fully oxidized or reduced, or ion vacancies are created. For the example, barium cations create aliovalent substitution defects 504 since the barium cation replaces two lithium cations. The +2 charged barium cation replaces a single charged lithium cation and, since charge neutrality in the lattice is maintained, a defect 504 occurs.

In some situations, the lithium iodide solid electrolyte with defects is reinforced with a reinforcing structure. The reinforcement structure is a porous structure of a material that is different from the lithium iodide and has characteristics that provide an improvement to the resulting reinforced solid electrolyte over a solid electrolyte without a reinforcing structure. Such a technique, for example, can be used to increase the toughness and strength of the solid electrolyte material when formed into a reinforced solid electrolyte with defects. Some examples of reinforcing structures include meshes and foams of different materials, such as metal foams, ceramic foams, glass foams, woven wire meshes, and fiberglass meshes. Other types of reinforcing structures can be used in some situations. For the example discussed below, the reinforcing structure is a metal foam. In situations where the reinforcement structure is electrically conductive, a dielectric material can be deposited onto the structure to transform the overall structure from electrically conductive to non-electrically conductive. Such a technique minimizes the likelihood of electrically short circuiting the cell. In some situations, a coating may be required to protect the reinforcement structure from chemical attack.

Figure 6:
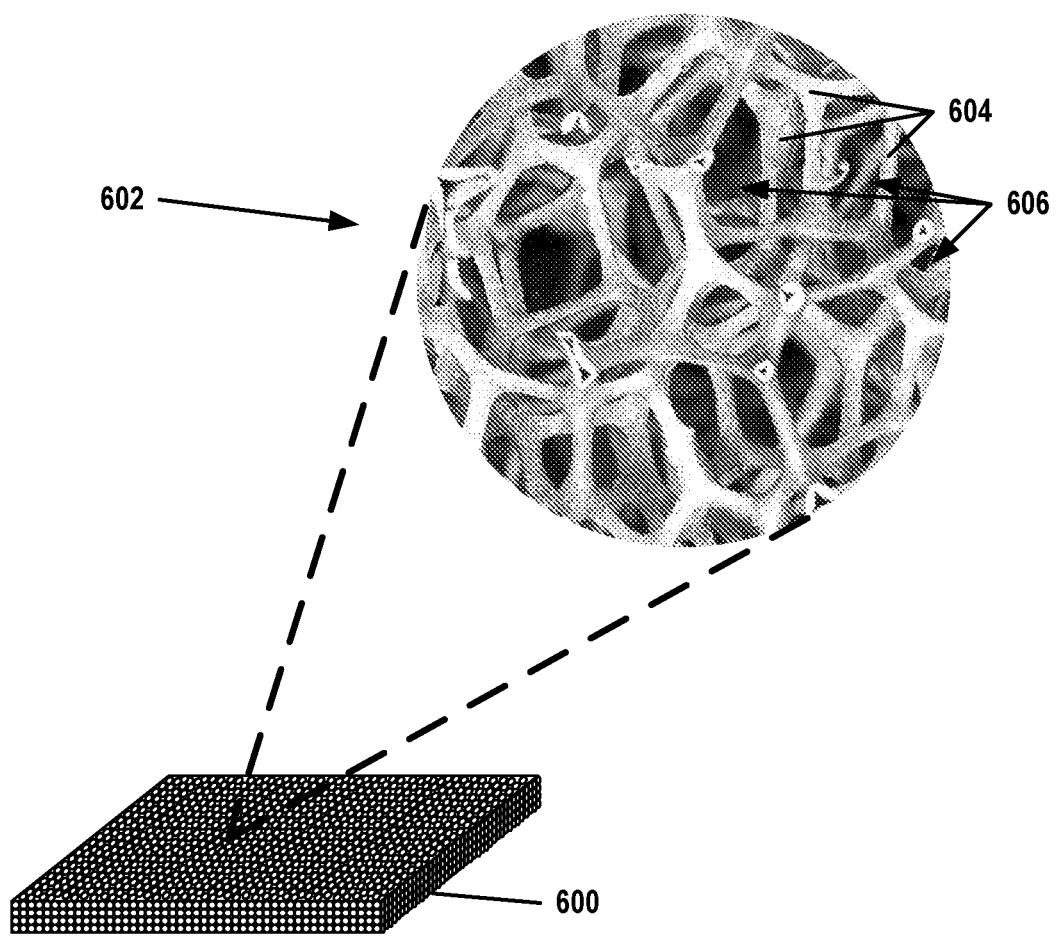
FIG. 6 is an illustration of an example of a block of metal foam suitable for use with the solid electrolyte within a thermal battery.

FIG. 6 is an illustration of an example of a block of open cell metal foam 600 suitable for use with the solid electrolyte within a thermal battery. A magnified view of the foam structure 602 in the example reveals a metal structure with metal structure components 604 separated by pores (open spaces) 606. The metal foam for the example has an open cell structure where the pores 606 between the metal components 604 of the metal foam 600 are interconnected. For the example, the material used for the metal foam has a melting point above the melting point of the lithium iodide. As a result, the lithium iodide can be heated to a fluid state and can be permeated throughout the metal foam without melting the metal foam. For the example, the metal foam is carbon steel although other materials may be used in some circumstances. Examples of other suitable materials include cast iron, low alloy steels, stainless steels, such as SS316, SS304, and SS410, Ti alloys, Ni alloys, W alloys, ceramics (e.g. silicon carbide (SiC), $B_4C$, magnesia (MgO), calcium oxide (CaO), boron nitride (BN), zirconia, cordierite, alumino-silicates, Macor®, Mullite, and aluminum nitride (AlN)), graphite, carbon, Steatite L-5, quartz, sapphire, silicon, silica glass, soda glass, borosilicate, brick, stone, and concrete. Accordingly, reinforcing structures other than metal foams can be used in some circumstances although carbon steel foam is used for the example.

Figure 7A:
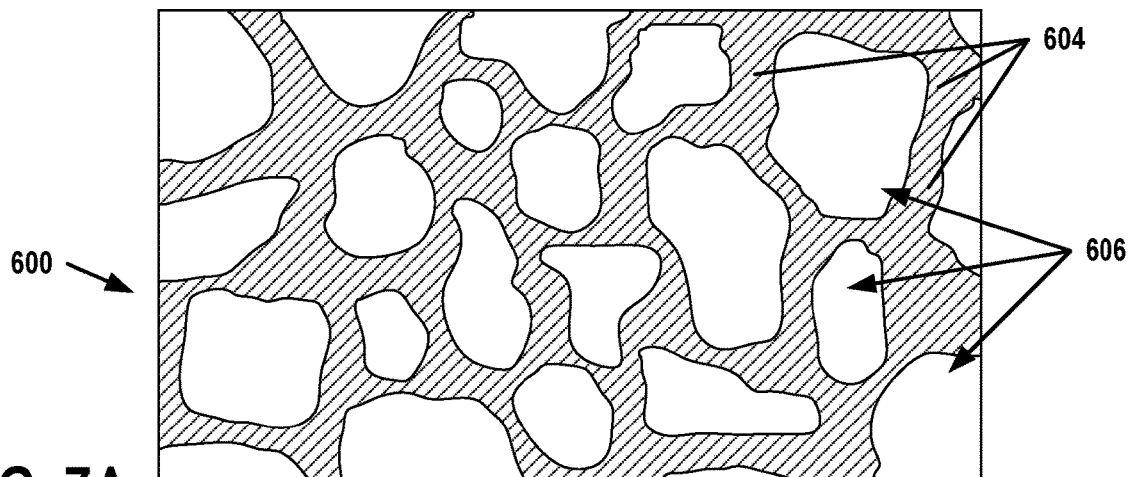
FIG. 7A is an illustration of an example of a cross section of the metal foam.

FIG. 7A is an illustration of an example of a cross section of the metal foam 600. The pores 606 within the metal foam 600 and between the metal structure components 604 are interconnected in the open cell structure. Typically, metal foams are characterized by porosity and pore density, such as pores per inch (ppi). Although other pore densities can be used, an example of a suitable pore density is in the range between 25 ppi and 500 ppi. For the example, the metal foam has density of approximately 100 ppi. Generally, metal foams have a relatively high porosity where 5-25% of the volume is the base metal. The metal foam may be manufactured using any of numerous techniques. One example includes the powder method where space holders are used to occupy the pore spaces and channels. During the casting processes, foam is cast with an open celled polyurethane foam skeleton. Therefore, metal in a powder form is poured into a polyurethane foam skeleton and heated to anneal the metal together and to burn out the polyurethane.

Figure 7B:
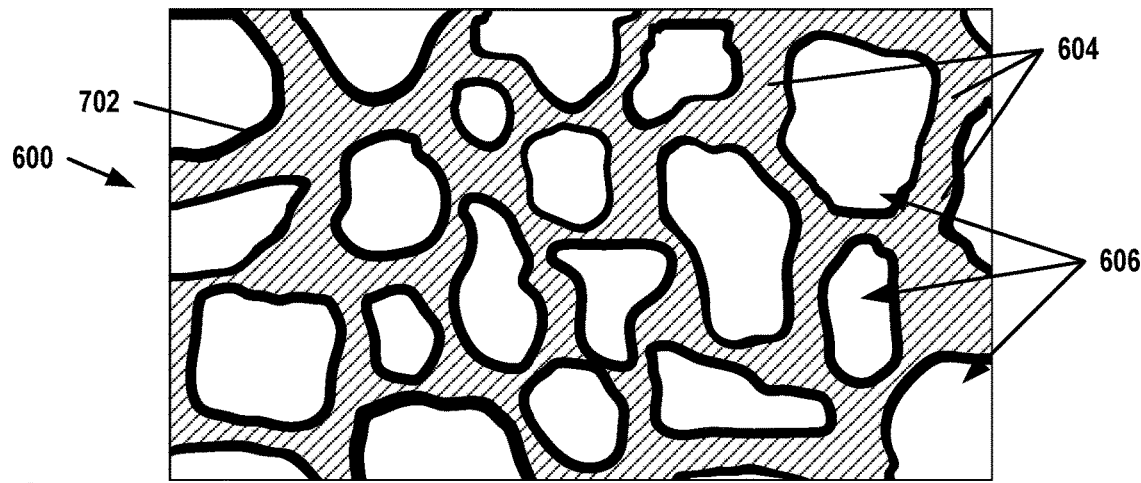
FIG. 7B is an illustration of an example of a cross section of the metal foam after a dielectric material has been deposited onto the metal foam structure.

FIG. 7B is an illustration of an example of a cross section of the metal foam 600 after a dielectric material 702 has been deposited to the metal foam structure. The dielectric material 702 is deposited onto the metal foam using known techniques. For example, the dielectric material can be deposited using chemical vapor deposition techniques. Other examples include molten salt electrochemical deposition, atomic layer deposition (ALD), and physical vapor deposition (PVD). The dielectric material 702 is stable with the other battery components at least within the operating temperature range. For the example, the dielectric material is magnesium oxide (MgO). Examples of other dielectric materials include Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium (III) oxide ($Er_2O_3$), Yttrium(III) oxide ($Y_2O_3$), Lithium chloride (LiCl), Holmium(III) oxide ($Ho_2O_3$), Neodymium (III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), and Mendelevium(III) oxide ($Md_2O_3$). Other potential dielectric materials that may be suitable for use with lithium iodide and the metal foam include Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3MgSi_2O_7$, Merwinite ($Ca_3Mg(SiO_4)_2$), Calcium silicate ($CaSiO_3$). These ceramics are typically less vulnerable to chemical attack from the components of the thermal lithium battery and are typically not electrically conductive although the conductivity may increase with temperature. Therefore, selection of the ceramic materials may be based on the electrical conductivity and susceptibility to chemical attack at the operating temperature range of the battery. In some situations, more than one type of dielectric material can be used. For the example of the metal foam, a dielectric is used to insulate the conductive metal from the electrodes to avoid electrical short circuits through the electrolyte structure as well as to protect the metal foam from chemical attack from molten lithium, sulfur, and di-lithium polysulfide products. In some situations, a dielectric coating protects the reinforcing structure from a chemical attack from other components within the battery, such as molten lithium, sulfur, and di-lithium polysulfide products. Even in situations where a non-conductive material is used for the reinforcing structure, the reinforcing structure may be coated with a dielectric material to protect the structure from chemical attack from molten lithium and/or molten sulfur and/or di-lithium polysulfide products. For example, a coating may be useful with reinforcing structures containing ceramics, such as alumina, silicon carbide, and others discussed below. The dielectric materials discussed above may be used to coat such materials to protect them from chemical attack from the molten lithium, molten sulfur and/or molten di-lithium polysulfide products.

As mentioned above, ceramics can be used for the reinforcing structure material. Examples of some ceramics that can be used in some situations include Magnesium oxide (MgO), Boron nitride (BN), Calcium oxide (CaO), Tantalum (III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium(III) oxide ($Er_2O_3$), Yttrium(III) oxide ($Y_2O_3$), Lithium chloride (LiCl), Holmium(III) oxide ($Ho_2O_3$), Neodymium(III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), Mendelevium (III) oxide ($Md_2O_3$). These ceramics are typically less vulnerable to chemical attack from the components of the thermal lithium battery and are typically not conductive although the conductivity may increase with temperature. Therefore, selection of the ceramic materials may be based on the electrical conductivity and susceptibility to chemical attack at the operating temperature range of the battery. As a result, a dielectric coating may not need to be applied with at least some of these materials. Nonetheless, a coating may be applied for other reasons.

Other ceramics that may be used for reinforcing structure material in some situations include Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3MgSi_2O_7$, Merwinite ($Ca_3Mg(SiO_4)_2$), and Calcium silicate ($CaSiO_3$). A coating may be useful for these ceramics since at least some may be vulnerable to chemical attack from the components of the thermal lithium battery or may become electrically conductive at the operating temperature of the battery.

Examples of ceramics that may be used for the reinforcing structure material that likely require a coating include Tantalum carbide (TaC), Tantalum nitride (TaN), Tantalum diboride ($TaB_2$), Tungsten carbide (WC), Tungsten diboride ($WB_2$), Hafnium carbide (HfC), Hafnium nitride (HfN), Hafnium diboride ($HfB_2$), Zirconium carbide (ZrC), Zirconium nitride (ZrN), Zirconium diboride ($ZrB_2$), Silicon carbide (SiC), Silicon nitride ($Si_3Ni_4$), Niobium carbide (NbC), Niobium nitride (NbN), Niobium diboride ($NbB_2$), Titanium carbide (TiC), Titanium nitride (TiN), Titanium diboride ($TiB_2$), Vanadium carbide (VC), Vanadium nitride (VN), Boron carbide ($B_4C$), Aluminum Nitride (AlN), Alumina ($Al_2O_3$), and Silica ($SiO_2$). Selection of materials for use in the battery is based on several factors, such as the melting points of the material and other materials in the battery, likelihood of reaction with other battery materials at the operating temperature, conductivity of the material at the operating temperature, and how easily the material dissolves in LiI and Li. Other design factors for selecting the material may include cost, density, and toxicity, as well as others.

Figure 7C:
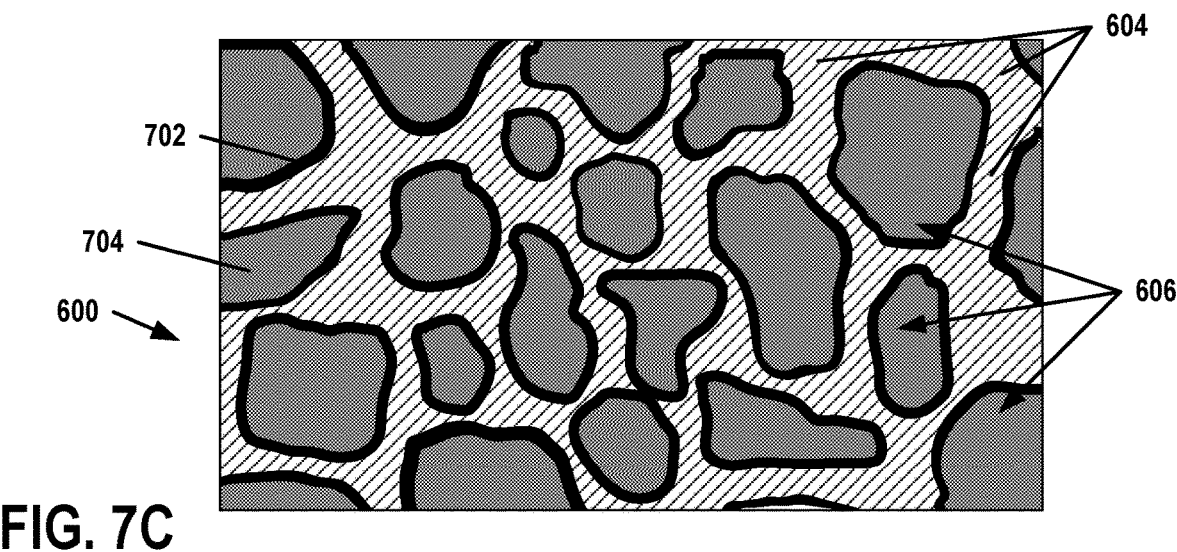
FIG. 7C is an illustration of an example of a cross section of the metal foam 600 after the lithium iodide has been diffused within the metal foam.

FIG. 7C is an illustration of an example of a cross section of the dielectric coated metal foam 600 after the lithium iodide 704 has been flowed, poured or otherwise deposited into the metal foam. During formation of the reinforced solid electrolyte, molten lithium iodide with defects is flowed into the metal foam 600. After pores 606 are filled with the liquid lithium iodide that includes grain boundary defects and/or aliovalent substitution defects, the materials are allowed to cool to form the reinforced solid electrolyte with defects. In some situations, the metal foam is filled with nanoparticles before the liquid lithium iodide is deposited in the foam structure. In yet other situations, solid particles of LiI comprising defects are poured into the metal foam 600, then heated to anneal or melt the LiI comprising defects in place, and finally, allowed to cool.

Figure 8:
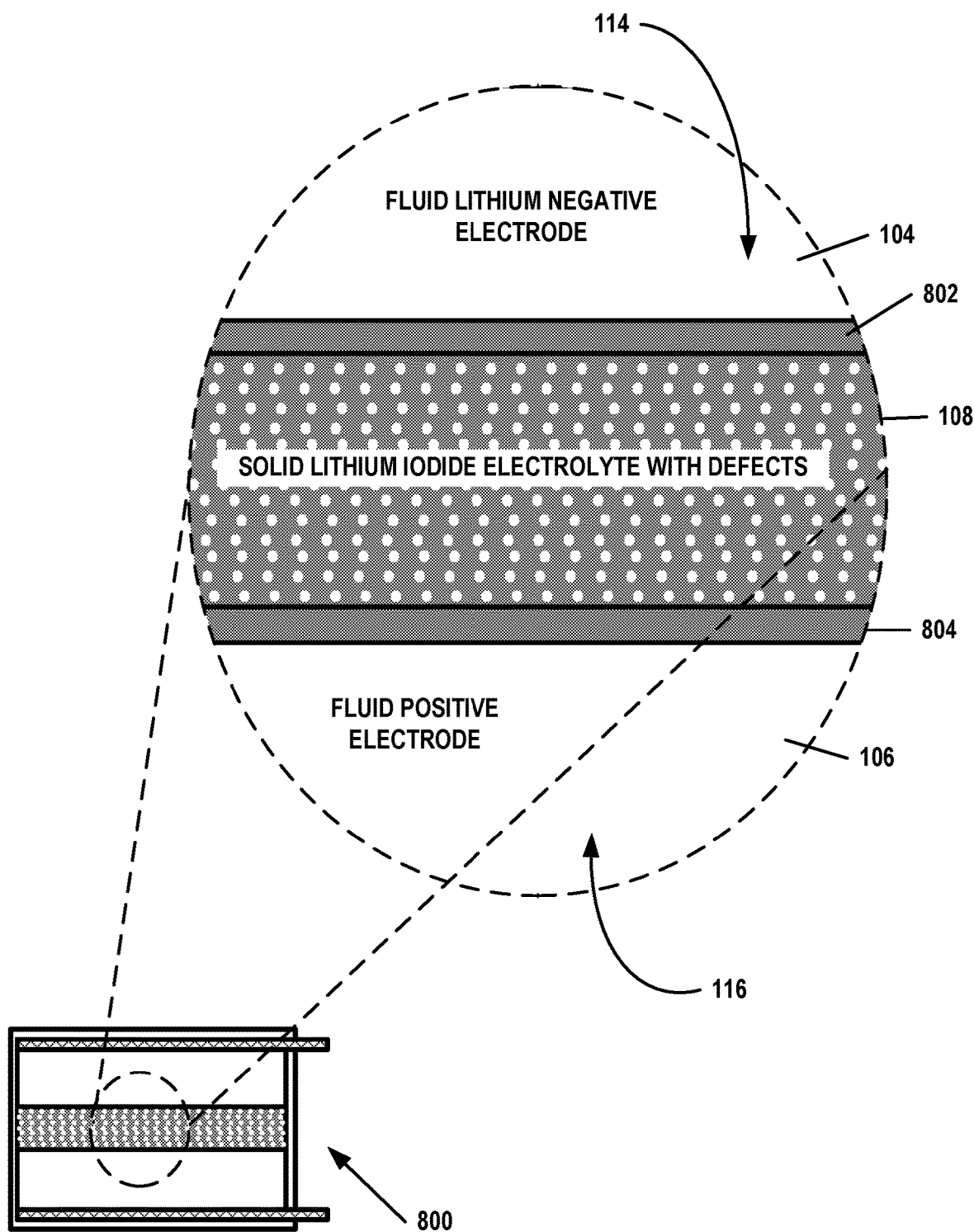
FIG. 8 is an illustration of an example of a thermal battery with a solid LiI electrolyte with defects that includes protective layers that comprise LiI between the electrolyte and the electrodes.

FIG. 8 is an illustration of an example of a thermal battery 800 with a solid LiI electrolyte 108 with defects that includes protective layers 802, 804 between the electrolyte 108 and the electrodes 104, 106. The protective layers 802, 804 protect the solid electrolyte from chemical attack by materials in the electrodes and comprise LiI for the example. The large dashed oval in FIG. 8 provides a close-up view of a portion of the battery 800 near the solid electrolyte 108. The battery 800 differs from the battery 100 discussed above in that the battery includes the additional protective layers 802, 804. The battery 800 of FIG. 8, therefore, is an example of the battery apparatus 100 where protective layers 802, 804 are interposed between the electrodes 104, 106 and the electrolyte 108. The protective layers 802, 804 include minimal amounts, if any, of materials that are reactive with, or otherwise susceptible to chemical attack from, electrode materials at the operating temperatures of the battery. In one situation, for example, the protective layers are high purity LiI and do not include any additional materials. At a minimum, the concentration of materials that are reactive with either electrode material is significantly less than the concentrations that may be found in the LiI electrolyte with defects 108. In other situations, the protective layers include additional materials that are not reactive with the electrode materials at the operating temperatures of the battery. For example, materials may be added to the protective layers to introduce or maintain defects where the additional materials are not reactive with the electrode materials. Therefore, the protective layers may include defects formed or pinned by materials other than materials in the solid LiI electrolyte 109. Such a structure may be useful where the electrolyte with defects 108 includes materials that may be reactive with one or both of the electrode materials. For example, a ceramic, such as alumina can be introduced in the electrolyte without coating the alumina while minimizing the potential for reaction between the fluid lithium and the alumina in the electrolyte. The protective layers, therefore, form inert coatings on the solid electrolyte 108 allowing the solid electrolyte 108 to include nanoparticles, such as alumina, zirconia, titanium oxide that are mechanically sound at the operating temperature and stable with respect to LiI yet are vulnerable to chemical attack by an electrode material, such as molten lithium. With the protective layers, the solid electrolyte may include aliovalent substitution defects formed by materials, such as $Sr^{2+}$ and $Al^{3+}$ which are vulnerable to chemical attack by an electrode material, such as molten lithium and may not be highly mobile in the LiI lattice. Cations that are highly mobile in the lattice are likely to diffuse through the LiI coatings and potentially dissolve into the molten lithium electrode. Over time, the number of aliovalent substitutions could diminish resulting in fewer defects and poorer performance of the $Li^+$ transport through the electrolyte.

The protective layer, therefore, provides a chemically insulating layer between the electrode material and the electrolyte. The protective layers could have a defect concentration of zero or near zero where for example, the protective layers include only high purity LiI. In other situations, however, the protective layers may have high defect concentrations due to materials that are chemically resistant to the fluid electrodes.

For the example, each protective layer has a thickness on the order of 50 nm although other thicknesses may be used in some circumstances. Generally, the protective layer should have a sufficient thickness to provide the desired isolation between the electrode and the electrolyte without exceeding an acceptable level of impedance between the electrolyte and the electrode such that ionic transfer is not significantly impacted. In one example, the protective layers are deposited onto the LiI electrolyte with defects prior to exposing the electrolyte to the electrode materials. In another example, one or both of the layers are formed by exposing the electrolyte with defects to the electrode material. With such a technique, the electrode material could react with the introduced material within the electrolyte until a stable LiI layer remains. For instance, a solid electrolyte of lithium iodide with a concentration of alumina nanoparticles could be used. Once this solid electrolyte is exposed to molten lithium, the molten lithium reacts with the alumina nanoparticle to form aluminum and lithium oxide. The aluminum is likely to dissolve into the molten lithium thereby leaving a crater in the solid electrolyte. This process continues until the molten lithium has access only to lithium iodide. This method sacrifices the top surface of the solid electrolyte, but effectively establishes a stable lithium iodide surface between the fluid electrode and the solid electrolyte. This method can also be used for defects associated with aliovalent substitutions, such as magnesium or calcium that are susceptible to chemical attack by molten lithium. In a typical situation, the concentration of these defect causing or defect sustaining materials is critical to the viability of this technique. For instance, if the concentration of alumina nanoparticles is too high, then the entire solid electrolyte could be destroyed by the molten lithium electrode. Although the example includes a protective layer between each electrode and the electrolyte interface, only a single layer may be used in some situations.

In situations where materials are introduced into the protective layers 802, 804 to generate defects or pin existing defects, the materials can be resistant to chemical attack from the electrode materials. In most situations, such protective layers can be thicker than protective layers composed of higher purity LiI. The ion transport characteristics of protective layers with defects, for example, may be better than protective layers of higher purity LiI. As a result, a thicker protective layer with defects may have acceptable ion transport characteristics. This approach could be advantageous if the materials that generate defects or pin existing defects that are resistant to chemical attack from the electrodes are more expensive than the materials that generate defects or pin existing defects that are not resistant to chemical attack. For instance, magnesia (MgO) nanoparticles may be more expensive than alumina ($Al_2O_3$) nanoparticles. An example of a cost-effective implementation, therefore, includes using magnesia nanoparticles in the protective layer 802 and using alumina nanoparticles in the solid LiI electrolyte 108.

Figure 9:
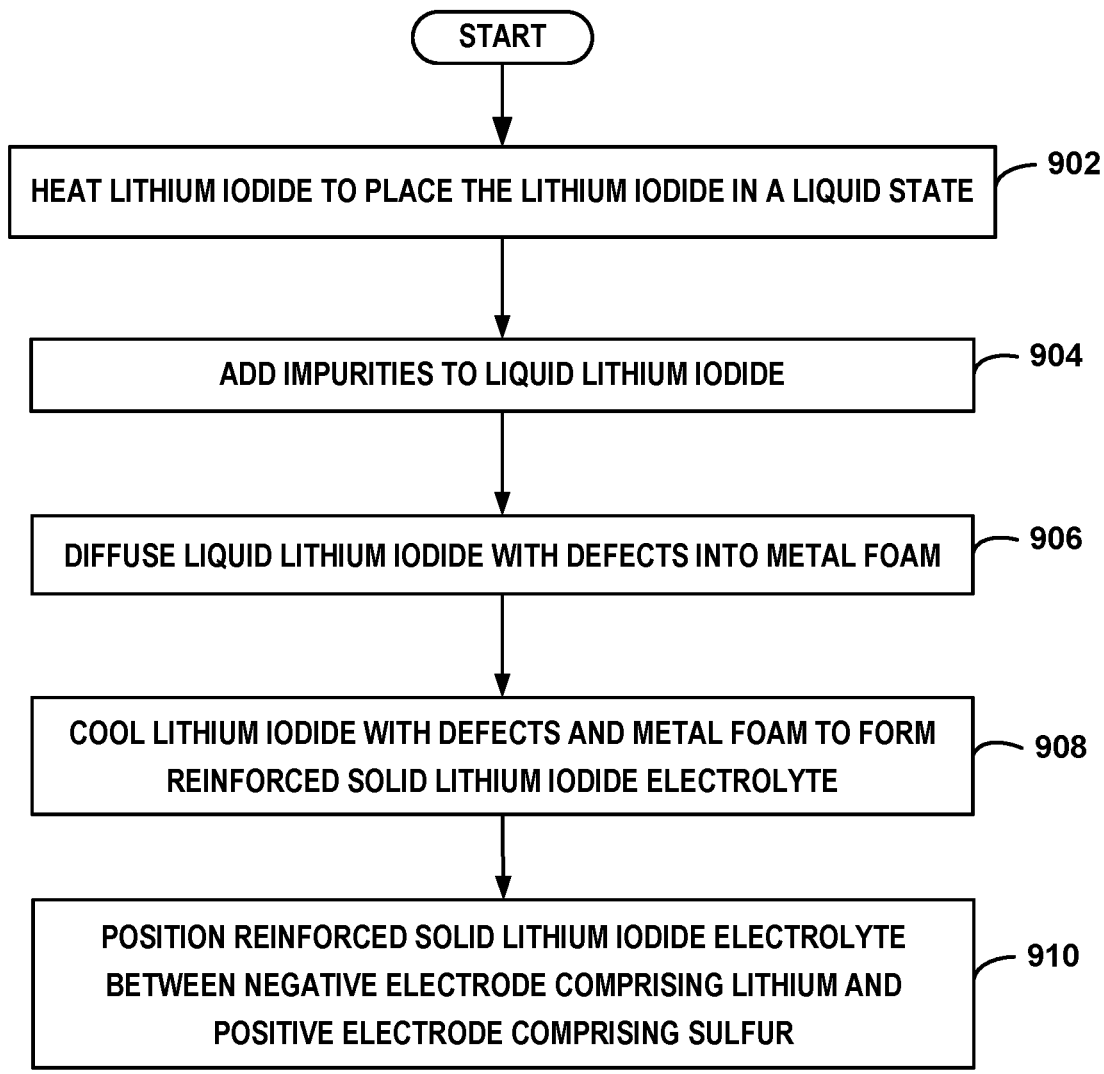
FIG. 9 is a flowchart of an example of forming a thermal lithium battery having a solid lithium iodide electrolyte with defects.

FIG. 9 is a flowchart of an example of forming a thermal lithium battery having a solid lithium iodide electrolyte with defects. The steps of FIG. 9 can be performed in a different order than shown and some steps may be combined into a single step. Additional steps may be performed and some steps may be omitted.

At step 902, lithium iodide is heated until it is in a liquid phase. For the example, the lithium iodide is heated to at least 469° C.

At step 904, impurities are added to the liquid lithium iodide. As discussed above the impurities may be nanoparticles of selected materials that form grain boundary defects or pin existing grain boundary defects or may be materials that form aliovalent substitution defects. In some cases, multiple materials may be added.

At step 906, the liquid lithium iodide with defects is flowed into the metal foam with the dielectric deposition. As discussed above, other foams may be used in some situations. For example, ceramic or glass foam may be used where the characteristics of the particular foam material are adequate for the intended purpose. For example, metal foams with dielectric coatings may be preferred in many circumstances because of the toughness. The liquid lithium iodide with defects is added to the metal foam with the dielectric deposition. As mentioned above, the nanoparticles may be added to the foam before the defect free lithium iodide is deposited in the foam in other examples. Also, the method of forming the lithium thermal battery may be applied to form thermal batteries with reinforced solid electrolytes that use other types of reinforcing structures.

At step 908, the lithium iodide with defects and metal foam with the dielectric coating is cooled to form the reinforced solid lithium iodide electrolyte. The resulting structure is mechanically superior and tougher than an electrolyte without the metal foam without a significant reduction in ion transportability.

At step 910, the reinforced solid lithium iodide electrolyte is positioned between a negative electrode comprising lithium and a positive electrode comprising sulfur within a battery. During operation of the battery, the negative and positive electrodes are in a fluid state. As discussed above, the positive electrode may also contain phosphorous in some situations.

Combinations and modifications to the techniques discussed above can be used to achieve similar results. For example, in some situations, the reinforcing structure can be used as a defect-causing material or defect-holding material (i.e., pinning material) and the addition of nanoparticles to the lithium iodide can be omitted or the concentration of nanoparticles can be reduced. Such a situation may occur where the pore density of the reinforcing structure is sufficiently high to result in an adequately high concentration of grain boundary defects within the lattice to improve ion transport characteristics of the sold electrolyte or sufficiently high to result in adequately holding the grain boundary defects formed during the synthesis process in place to maintain the high ion transport characteristics of the sold electrolyte. In other words, the reinforcing structure components may result in grain boundary defects within the interfacial area near the reinforcing structure and the relatively small distances between the reinforcing structure components may lead to appropriate spacing between defects to improve ion transportability. In some situations, the reinforcing structure components may pin the grain boundary defects formed within the solid electrolyte during the synthesis process. In another potential modification to the techniques above, the introduction of nanoparticles to the lithium iodide may create the reinforcing structure.

Figure 10:
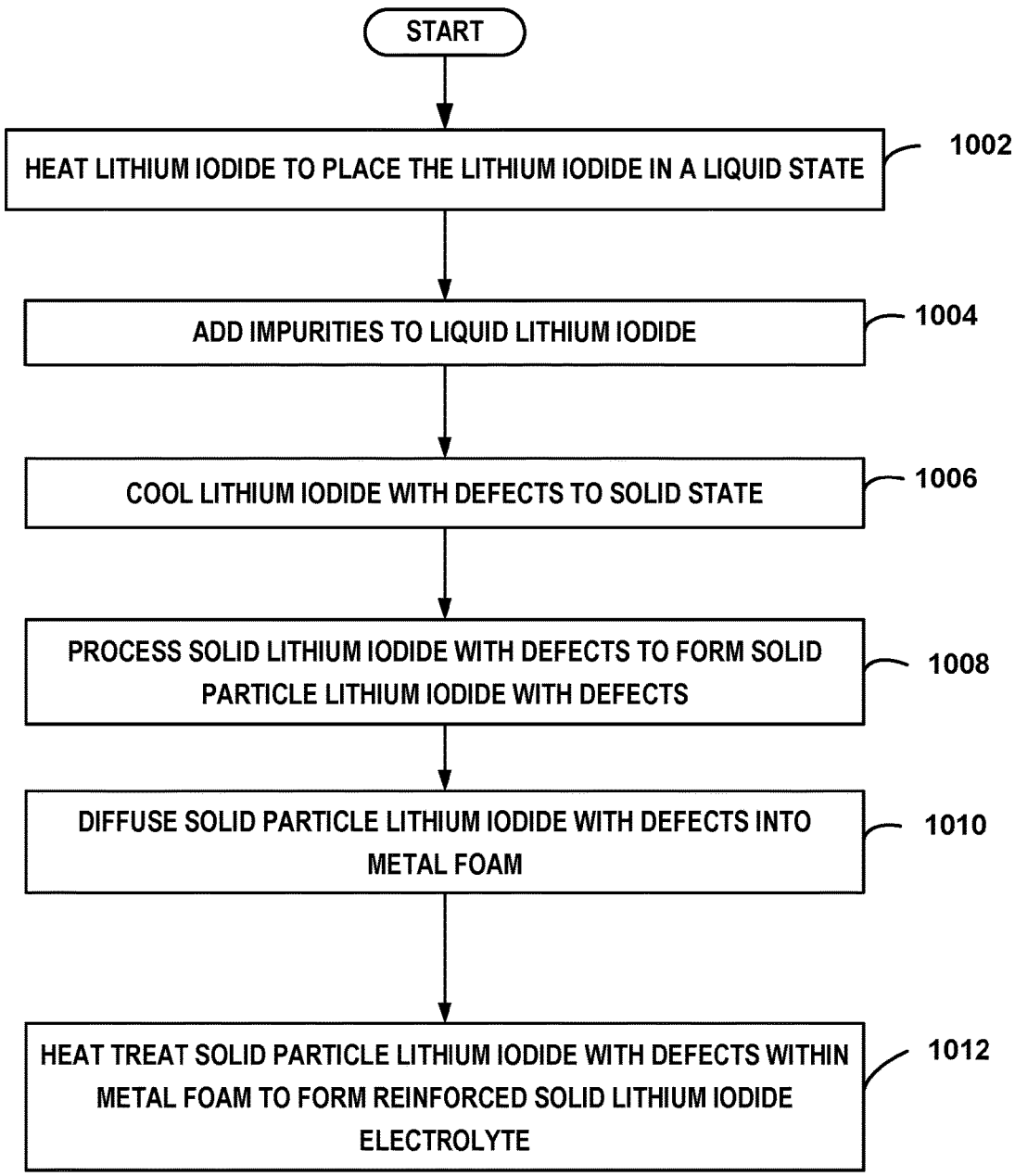
FIG. 10 is a flowchart of an example of forming a solid electrolyte with defects where the LiI material is heat treated within the reinforcing structure.

FIG. 10 is a flowchart of an example of forming a solid electrolyte with defects 108 where LiI material is annealed within the reinforcing structure. For the example of FIG. 10, the LiI with defects material is in a solid particle form when diffused throughout the reinforcing structure. The LiI with defect material is then annealed to form the solid electrolyte with defects 108. The steps of FIG. 10 can be performed in a different order than shown and some steps may be combined into a single step. Also, additional steps may be performed and some steps may be omitted.

At step 1002, lithium iodide is heated until it is in a liquid phase. For the example, the lithium iodide is heated to at least 469° C.

At step 1004, impurities are added to the liquid lithium iodide. As discussed above, the impurities may be nanoparticles of selected materials that form grain boundary defects or pin existing grain boundary defects or may be materials that form aliovalent substitution defects. In some cases, multiple materials may be added.

At step 1006, the lithium iodide with defects is cooled to the solid state.

At step 1008, the solid lithium iodide with defects is processed to form solid particles of lithium iodide with defects. The solid material is ground, powdered, pulverized or otherwise broken down into fine particles, such as a powder. For the example, the solid lithium iodide with defects is broken into smaller particles before being converted to a powder. With one technique, a grinder breaks down the solid material into smaller particles and a ball mill further processes the particles to form a lithium iodide powder with defects. Other techniques can be used where the resulting particle material is sufficiently fine to allow the particle material to be adequately diffused within the reinforcing structure.

At step 1010, the solid particle lithium iodide with defects is diffused within a reinforcing structure, such as metal foam with a dielectric coating. The fine particles of material are sifted or otherwise poured into the reinforcing structure. In some situations, vibration, rotation or other manipulation of the reinforcing structure is used to ensure adequate dissipation of the solid particle lithium iodide within the structure.

At step 1012, the solid particle lithium iodide with defects within the reinforcing structure is heat treated to minimize the porosity of the lithium iodide with defects. Such a heat treatment is sometimes referred to as annealing. During the heat treating, the solid particle lithium iodide with defects is heated to a temperature sufficient to facilitate the reduction in porosity and formation of the solid lithium iodide electrolyte. An example of a suitable temperature in many situations is a temperature that is approximately two thirds of the absolute melting point temperature of the lithium iodide with defects material. In some situations, pressure can be applied during heat treatment.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
a negative fluid electrode comprising lithium and being fluid at least within an operating temperature range of the apparatus;
a positive fluid electrode being fluid at least within the operating temperature range of the apparatus;
a porous reinforcing structure; and
a solid electrolyte comprising lithium iodide and positioned between the negative fluid electrode and the positive fluid electrode and distributed within the porous reinforcing structure, the solid lithium iodide electrolyte in a solid state at least within the operating temperature range of the apparatus and having a lithium iodide lattice comprising a plurality of lithium cations and a plurality of iodide anions.

2. The apparatus of claim 1, wherein the reinforcing structure comprises a material selected from the group consisting of cast iron, low alloy steel, stainless steel, SS316 stainless steel, SS304 stainless steel, SS410 stainless steel, Ti alloy, Ni alloy, W alloy, molybdenum, Mo alloy, TZM molybdenum, tantalum, niobium, rhenium, Ta alloy, Nb alloy, silicon nitride ($Si_3N_4$), alumina ($Al_2O_3$), silicon carbide (SiC), $B_4C$, magnesia (MgO), calcium oxide (CaO), boron nitride (BN), zirconia, cordierite, alumino-silicate, Macor®, Mullite, and aluminum nitride (AlN), graphite, carbon, Steatite L-5, quartz, sapphire, silicon, silica glass, soda glass, borosilicate, brick, stone, concrete, and combinations thereof.

3. The apparatus of claim 1, wherein the reinforcing structure comprises material selected from the group consisting of Magnesium oxide (MgO), Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium (III) oxide ($Gd_2O_3$), Erbium(III) oxide ($Er_2O_3$), Yttrium(III) oxide ($Y_2O_3$), Lithium chloride (LiCl), Holmium(III) oxide ($Ho_2O_3$), Neodymium(III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), Mendelevium(III) oxide ($Md_2O_3$), Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3MgSi2O_7$, Merwinite ($Ca_3Mg(SiO_4)_2$), Calcium silicate ($CaSiO_3$), Tantalum carbide (TaC), Tantalum nitride (TaN), Tantalum diboride ($TaB_2$), Tungsten carbide (WC), Tungsten diboride ($WB_2$), Hafnium carbide (HfC), Hafnium nitride (HfN), Hafnium diboride ($HfB_2$), Zirconium carbide (ZrC), Zirconium nitride (ZrN), Zirconium diboride ($ZrB_2$), Silicon carbide (SiC) Silicon nitride ($Si_3Ni_4$), Niobium carbide (NbC), Niobium nitride (NbN), Niobium diboride ($NbB_2$), Titanium carbide (TiC), Titanium nitride (TiN), Titanium diboride ($TiB_2$), Vanadium carbide (VC), Vanadium nitride (VN), Boron carbide ($B_4C$), Aluminum Nitride (AlN), Alumina ($Al_2O_3$), Silica ($SiO_2$) and combinations thereof.

4. The apparatus of claim 1, wherein the solid lithium iodide electrolyte comprises a plurality of defects.

5. The apparatus of claim 4, the plurality of grain boundary defects comprising at least one of:
a plurality of nanoparticle grain boundary defects resulting at grain boundaries of the plurality of nanoparticles; and
a plurality of pinned grain boundary defects formed prior to an introduction of the plurality of nanoparticles and maintained in the lithium iodide lattice at least partially as a result of the introduction of the plurality of nanoparticles.

6. The apparatus of claim 4, wherein the reinforcing structure comprises a section of open cell foam, the solid lithium iodide electrolyte distributed within the open cell foam.

7. The apparatus of claim 6, wherein the open cell foam is a metal foam.

8. The apparatus of claim 6, wherein the open cell foam is a carbon open cell foam.

9. The apparatus of claim 6, wherein the open cell foam is a ceramic open cell foam.

10. The apparatus of claim 4, wherein the reinforcing structure is coated with a dielectric material.

11. The apparatus of claim 10, wherein the dielectric material is selected from the group consisting of magnesium oxide (MgO), Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium (III) oxide ($Er_2O_3$), Yttrium(III) oxide ($Y_2O_3$), Lithium chloride (LiCl), Holmium(III) oxide ($Ho_2O_3$), Neodymium (III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), Mendelevium(III) oxide ($Md_2O_3$), Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3 MgSi_2O_7$, Merwinite ($Ca_3Mg(SiO_4)_2$), Calcium silicate ($CaSiO_3$), and combinations thereof.

12. The apparatus of claim 4, wherein the plurality of defects comprises a plurality of grain boundary defects resulting at grain boundaries with nanoparticles.

13. The apparatus of claim 12, wherein the nanoparticles comprise magnesium cations.

14. The apparatus of claim 13, wherein the nanoparticles comprise magnesium oxide (MgO).

15. The apparatus of claim 12, wherein the nanoparticles comprise material selected from the group consisting of Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium(III) oxide ($Er_2O_3$), Yttrium(III) oxide ($Y_2O_3$), Lithium chloride (LiCl), Holmium(III) oxide ($Ho_2O_3$), Neodymium(III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), Mendelevium(III) oxide ($Md_2O_3$), and combinations thereof.

16. The apparatus of claim 12, wherein the nanoparticles comprise material selected from the group consisting of Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3 MgSi_2O_7$, Merwinite ($Ca_3Mg(SiO_4)_2$), Calcium silicate ($CaSiO_3$), and combinations thereof.

17. The apparatus of claim 12, wherein the nanoparticles comprise material selected from the group consisting of magnesium oxide (MgO), Boron nitride (BN), Calcium oxide (CaO), Tantalum(III) oxide ($Ta_2O_3$), Samarium (III) oxide ($Sa_2O_3$), Lithium oxide ($Li_2O$), Beryllium oxide (BeO), Terbium(III) oxide ($Tb_2O_3$), Dysprosium (III) oxide ($Dy_2O_3$), Thorium dioxide ($ThO_2$), Gadolinium(III) oxide ($Gd_2O_3$), Erbium(III) oxide ($Er_2O_3$), Yttrium(III) oxide ($Y_2O_3$), Lithium chloride (LiCl), Holmium(III) oxide ($Ho_2O_3$), Neodymium(III) oxide ($Nd_2O_3$), Ytterbium(III) oxide ($Yb_2O_3$), Lanthanum(III) oxide ($La_2O_3$), Praseodymium(III) oxide ($Pr_2O_3$), Lithium fluoride (LiF), Lutetium(III) oxide ($Lu_2O_3$), Scandium(III) oxide ($Sc_2O_3$), Thulium (III) oxide ($Tm_2O_3$), Samarium(III) oxide ($Sm_2O_3$), Cerium(III) oxide ($Ce_2O_3$), Mendelevium(III) oxide ($Md_2O_3$), Barium oxide (BaO), Strontium oxide (SrO), Magnesium fluoride ($MgF_2$), Cerium(IV) oxide ($Ce_2O$), Uranium(IV) oxide ($U_2O$), Europium (II) oxide (EuO), Zirconium dioxide ($ZrO_2$), Sodium fluoride (NaF), Europium(III) oxide ($Eu_2O_3$), Chrysoberyl ($BeAl_2O_4$), Calcium silicate ($Ca_2SiO_4$), Hafnium(IV) oxide ($HfO_2$), Calcium titanate ($CaTiO_3$), $Ca_2Al_2SiO_7$, Magnesium aluminate ($MgAl_2O_4$), Kalsilite ($KAlSiO_4$), Magnesium Metasilicate ($MgSiO_3$), $CaMg(SiO_4)_2$, $Ca_3 MgSi_2O_7$, Merwinite ($Ca_3Mg(SiO_4)_2$), Calcium silicate ($CaSiO_3$), and combinations thereof.

18. The apparatus of claim 4, wherein the plurality of defects comprises a plurality of aliovalent substitution defects.

19. The apparatus of claim 18, wherein the solid lithium iodide electrolyte further comprises defect causing ions and wherein the plurality of aliovalent substitution defects comprises aliovalent substitution defects resulting from the defect causing ions.

20. The apparatus of claim 19, wherein the defect causing ion is a barium cation ($Ba^{2+}$).

21. The apparatus of claim 4, wherein the positive fluid electrode comprises sulfur (S).

22. The apparatus of claim 21, wherein the positive fluid electrode comprises phosphorous (P).

23. The apparatus of claim 4, wherein the operating temperature range of the apparatus is contained within the range of 365° C. to 469° C.

24. The apparatus of claim 23, wherein the operating temperature range of the apparatus is contained within the range of 375° C. to 444° C.

25. The apparatus of claim 24, wherein the operating temperature range of the apparatus is contained within the range of 375° C. to 425° C.

26. The apparatus of claim 1, further comprising:
a heating system arranged and configured to heat the reaction chamber to an operating temperature within the operating temperature range of the apparatus.

27. The apparatus of claim 1, wherein the solid lithium iodide electrolyte is at least 99% pure lithium iodide.

* * * * *